US007719156B2

(12) United States Patent
Mühlberger et al.

(10) Patent No.: US 7,719,156 B2
(45) Date of Patent: May 18, 2010

(54) STATOR MODULE

(75) Inventors: Uwe Mühlberger, Heidenheim (DE);
Andreas Lange, Zang (DE); Rolf Hoffmann, Heidenheim (DE)

(73) Assignee: Voith Turbo GmbH & Co., Heidenheim (DE)

( * ) Notice: Subject to any disclaimer, the term of this patent is extended or adjusted under 35 U.S.C. 154(b) by 495 days.

(21) Appl. No.: 11/578,360

(22) PCT Filed: Feb. 9, 2005

(86) PCT No.: PCT/EP2005/001304

§ 371 (c)(1),
(2), (4) Date: Jun. 8, 2007

(87) PCT Pub. No.: WO2005/109610

PCT Pub. Date: Nov. 17, 2005

(65) Prior Publication Data

US 2007/0252448 A1     Nov. 1, 2007

(30) Foreign Application Priority Data

Apr. 14, 2004    (DE) .................. 10 2004 018 520

(51) Int. Cl.
*H02K 1/00* (2006.01)
(52) U.S. Cl. .............................. 310/216.004; 310/254.1
(58) Field of Classification Search .................. 310/52, 310/58, 216, 179, 184, 254, 261, 258–259, 310/162, 216.004
See application file for complete search history.

(56) References Cited

U.S. PATENT DOCUMENTS 4,835,839 A * 6/1989 Forbes et al. .................. 29/596
5,006,748 A * 4/1991 Wintermute ................. 310/258
5,051,641 A * 9/1991 Weh ........................... 310/163

(Continued)

FOREIGN PATENT DOCUMENTS

DE        199 27 082        12/2000

(Continued)

OTHER PUBLICATIONS

International Search Report for PCT/EP2005/001304, dated Jul. 20, 2005.

(Continued)

*Primary Examiner*—Thanh Lam
(74) *Attorney, Agent, or Firm*—Ohlandt, Greeley, Ruggiero & Perle, L.L.P.

(57) ABSTRACT

The invention relates to a stator module for a synchronous machine with transversal flux guidance, in particular a transversal flux machine having at least one phase, having a stator unit that is provided for the single phase and bearing an armature winding and that, in the assembled position, is provided for a rotor with the formation of an air gap, which is arranged in the radial direction in relation to the axis of rotation of the rotor of the synchronous machine. Said stator unit comprises two rows of teeth that are arranged in succession in the circumferential direction, the rows being connected together by means of a yoke unit for conduction of the magnetic flux. The invention is characterized by the following features: the yoke has an annular design; the yoke unit comprises magnetic lamination sheets stacked in succession in the circumferential direction.

23 Claims, 2 Drawing Sheets

U.S. PATENT DOCUMENTS

| | | | |
|---|---|---|---|
| 5,153,475 A * | 10/1992 | McSparran | 310/254 |
| 5,195,231 A * | 3/1993 | Fanning et al. | 29/596 |
| 5,235,231 A * | 8/1993 | Hisey | 310/259 |
| 5,300,845 A * | 4/1994 | Fanning et al. | 310/217 |
| 5,382,860 A * | 1/1995 | Fanning et al. | 310/216 |
| 5,525,852 A * | 6/1996 | Fanning et al. | 310/217 |
| 5,633,551 A * | 5/1997 | Weh | 310/266 |

FOREIGN PATENT DOCUMENTS

| | | |
|---|---|---|
| DE | 100 31 349 | 1/2002 |
| DE | 100 47 675 | 4/2002 |
| EP | 0 513 575 | 4/1992 |
| EP | 1 005 136 | 11/1999 |
| EP | 1 191 663 | 8/2001 |
| EP | 1 267 471 | 12/2002 |
| EP | 1 711 994 A | 11/2005 |

OTHER PUBLICATIONS

Written Opinion for PCT/EP2005/001304 and verified English translation.

* cited by examiner

STATOR MODULE

The invention relates to a stator module, in particular for a synchronous machine with transversal flux guidance, in detail with the features taken from the preamble of claim 1.

Synchronous machines with transversal flux guidance, in particular transversal flux machines, are known from a plurality of references in the prior art in a diversity of designs. They have a permanent magnetic excitation in the rotor. In a majority of the known synchronous machines with transversal flux guidance, permanent magnets are arranged along the circumference in a number corresponding to the pole number of the machine. To this end, the magnets are magnetized in the rotor in the circumferential direction, with corresponding flux-conducting elements being arranged between the magnets. A stator module is provided for the rotor with the formation of an air gap. The stator module of the machine comprises so-called C cores made of magnetically well-conducting material—for example, bundles of laminations made of iron. The magnetic flux is guided via the latter. Situated on the side of each pole lying opposite the air gap is a permanent magnet on the rotor. Depending on the embodiment of the machine, the magnetic field lines are guided either via short-circuit rings, which magnetically short-circuit a row of permanent magnets, or via so-called flux-conducting elements made of magnetically well-conducting material, which are arranged between the permanent magnets. In the latter solution, the flux passes tangentially through the permanent magnets, which are magnetized alternately in the circumferential direction. This kind of machine, in comparison to conventional machines having the same construction volume, makes it possible to attain a substantially higher torque density on account of the possibility of increasing the torque by increasing the pole number. However, a significant drawback of the known machines consists of the fact that they are composed of a plurality of separate parts, so that the overall machine is characterized by a high cost in terms of design and production engineering.

A generic design of a transversal flux machine, in which the focus lies on a simple and cost-effective fabrication is known in the prior art from the publication EP 1 005 136 A1. In it, permanent magnets and flux-conducting elements are mounted alternately in the rotor in the circumferential direction. The magnets are magnetized with alternating polarity in the circumferential direction. The stator module provided for the rotor comprises a plurality of individual soft-magnetic stator elements, which are arranged transversally to the direction of rotation. The stator elements are designed in the shape of U yokes. Here, the U yokes are oriented in a staggered manner in the direction of rotation, so that, on account of the magnetic potential difference, a torque-creating magnetic flux is generated. The staggering of the arms of the U-shaped stator elements with respect to a direction parallel to the axis of rotation of the machine occurs by one pole pitch.

The same characteristics can be achieved if, instead of the stator elements, the flux-conducting elements are designed at an angle. The closing of the magnetic circuit then occurs in the rotor via corresponding flux-conducting elements, it being possible thereby to dispense with separate short-circuit elements on the stator. In the process, the flux-conducting elements of the rotor are penetrated by the magnetic flux in all three dimensions. In order to prevent eddy-current losses, the flux-conducting elements are preferably manufactured from pressed soft-magnetic powders having isotropic characteristics. Numerous forms of construction are proposed in this publication for the magnetically conductive stator elements. However, in regard to the losses due to eddy currents, press-molded parts made of soft-magnetic powder materials have the best characteristics. When such material is used, the stator elements can be designed to be either tilted or not tilted. A drawback, however, is the substantially poorer magnetic conductivity in comparison to ferromagnetic material. In addition, the magnetic load on the stator elements is very high, especially in the tooth region, because increased magnetic reversal losses are to be expected there. It is questionable whether these loads can be withstood by the powder-molded teeth over a prolonged period of time. In addition to this, on account of the construction of the stator module from a plurality of individual stator elements, it is very complicated to design a force-fitting connection of the stator elements with the housing. In another solution according to this publication, it is therefore proposed to design the stator elements as C-core-like structures. Used for this is grain-oriented lamination sheet, the bundling of laminations being aligned along the course of the magnetic flux. Stator elements of this kind indeed have good characteristics in regard to magnetic conductivity and the creation of losses. However, they are comparatively complicated in terms of production and are thus very costly. Moreover, a design of this kind does not allow, without further ado, the production of stator elements tilted in the circumferential direction, in particular the tooth-forming arms.

The third solution approach according to the prior art consists of assembling the stator elements from stamped lamination-sheet segments. The bundling of laminations occurs here in the circumferential direction. The bundling of laminations largely prevents the creation of eddy current for the stator flux surrounding the coil. However, because the force-creating flux close to the air gap enters perpendicularly to the bundling of laminations at the pole horns, eddy-current losses that are not insubstantial are anticipated in this region. This solution also proves to be very complicated in terms of fastening the individual stator elements to the housing.

Known in the prior art from the publication DE 100 47 675 A1 is a stator module in which the stator unit that can be provided for one phase consists of an annular yoke element produced by powder metallurgy, which consists of a soft-magnetic powder composite material and has two open or closed rings of teeth connected to it. The stator module corresponds to a combination of rings of teeth and an inner yoke structure. The rings of teeth are fabricated from ferromagnetic materials and may therefore also be referred to as soft-iron units. In terms of the number of their individual teeth or tooth elements and the outer dimensions, they are identical in design and, in the circumferential direction, they are preferably arranged on the annular yoke element staggered by one pole pitch. On account of the electromagnetic characteristics of the powder composite material, this design also leads to markedly higher losses for the same construction space in comparison to the use of ferromagnetic material. This becomes particularly evident when a comparison is made between designs with U-shaped stator elements in the form of C cores and a design with yoke rings made of powder.

The invention is therefore based on the problem of further developing a stator module of the kind mentioned in the beginning in such a way that, on the one hand the mechanically proven construction in the regions of force transmission is retained and is accommodated in the same construction space with simple construction elements having the best magnetic conductivity and having adequate cross section so as to prevent excessive magnetic saturation. It must be possible for the cooling that has been hitherto integrated in the powder yoke ring to be accomplished with efficient effect in the same construction space as well.

The inventive solution is characterized by the features of claim 1. Advantageous embodiments are described in the subclaims.

The stator module for a synchronous machine with transversal flux guidance, in particular a transversal flux machine having at least one phase, comprises at least one stator unit that is provided for the single phase and carries an armature winding and that, in the assembled position, is provided for a rotor with the formation of an air gap, which is arranged in the radial direction in relation to the axis of rotation of the rotor of the synchronous machine. The stator unit comprises two rows of teeth or tooth elements that are arranged in succession in the circumferential direction, the rows being connected together by means of a yoke unit, the connection being made for conducting the magnetic flux. In accordance with the invention, the yoke unit has an annular design and comprises magnetic lamination sheets stacked in succession in the circumferential direction. Here, the magnetic lamination sheets are designed from grain-oriented magnetic lamination sheet. The majority of the directional vectors describing the principal magnetic direction are aligned at least with one directional component in the axial direction, that is, point from one ring of teeth or tooth element of one row toward the other respective row of tooth elements arranged in succession in the circumferential direction. Accordingly, a guidance of the magnetic flux from one tooth element via the yoke unit to the second row of tooth elements arranged in succession in the circumferential direction is accomplished. The inventive solution makes it possible, in the flux-conducting region, to employ a material having ideal characteristics, such as the best magnetic conductivity and a high saturation induction with the lowest losses due to magnetization reversal.

In order to fully exploit the characteristics of the lamination sheet, the space between the rotor shaft and the unchangeable force output on the inner stator must be optimally utilized, in particular inclusive of an improved cooling—preferably, a water cooling. In order to guide the magnetic flux transversally between the two rows of tooth elements arranged in the circumferential direction, the magnetic lamination sheets are stacked transverse to the axial direction. In order to utilize the space optimally, there are preferably two different radial lamination sheet heights and also two different stack heights. To this end, the individual magnetic lamination sheets are assembled into magnetic bundles of laminations, it being possible to mount the bundles as a unit or by lining up the individual sheets in succession. Here, each magnetic bundle of laminations comprises at least two magnetic lamination sheets arranged in succession in the circumferential direction. The individual magnetic bundles of laminations are arranged in succession in the circumferential direction in a spaced manner with the formation of intervening spaces. Arranged in the intervening spaces between two magnetic bundles of laminations, arranged adjacently in the circumferential direction, are spacer elements. Preferably provided in a stator unit are at least two different types of bundles of laminations, each of these being arranged alternately in succession in the circumferential direction. Furthermore, the individual magnetic bundles of laminations are then arranged at different stack heights. The intervening spaces formed between two bundles that are adjacent to each other in the circumferential direction are shaped like a piece of cake. Integrated in the intervening spaces, shaped like a piece of cake, are the spacer elements. These fix in place the individual magnetic bundles of laminations in the circumferential direction in relation to one another. The arrangement of the bundles of the magnetic lamination sheets in the circumferential direction or in the radial direction thereby occurs, in relation to the faces directed away from the axis of rotation in the radial direction, on a diameter, the faces of the individual types of bundles of laminations that point toward the axis of rotation lying on different diameters. Ensured in this way in the circumferential direction in the region of the faces pointing toward the axis of rotation is a fixing in place of the bundles of laminations with small separation or even with contact of the individual bundles of laminations in this region, whereas, in the radial direction directed outward, they gape apart from one another with the formation of intervening spaces.

The spacer elements themselves can be designed in different ways. They are preferably designed in the form of aluminum elements, in particular aluminum fingers, that is, elements whose cross section is shaped like a piece of cake or a square and which have cast or bored cooling channels. Preferably chosen, however, are designs of spacers that allow as much as possible a surface contact with the bundles of laminations over a larger region in the radial direction. The integrated cooling channels can be designed in different ways. Either they may extend over the axial extension of the spacer elements. In this case, corresponding connections are provided on the front faces of the spacer elements that are directed away from each other in the axial direction. Or, in the other case, the passage of at least one cooling channel of this kind occurs with return in a spacer element, the connections being provided on only one front surface. In this way, it is possible to cool the winding and the two rings of teeth indirectly and the bundle of laminations itself, the heat-conducting regions being kept relatively small or short, and thus a very effective cooling can be ensured.

Preferably, for improvement of the cooling effect, the necessary joint gap of the individual elements is filled with impregnating resin during impregnation of the winding. In this way, the bundles of laminations are provided with the required mechanical strength in this element assembly. The inventive solution offers the advantage of being able to transmit higher moments for the same applied current and of having reduced losses. An electric machine having a stator unit designed in this way is also characterized by a higher continuous output power, which can be increased still further by the improved cooling.

The arrangement and fixing in place of the individual bundles of laminations of the yoke unit can be produced in different ways. In the simplest case, they are fastened to the rings of teeth and to an annular intervening element, which is arranged between the rings of teeth and surrounds the yoke unit in the circumferential direction, in particular in the region of the inner diameter of these elements. The fastening can be produced in a force-fitting or a form-fitting manner. Preferably, slots correspondingly designed for this are provided on the inner circumferences of the elements. The intervening element surrounds the yoke unit in the radial direction and at least partially—preferably completely—in the circumferential direction and forms the supporting surface for the armature winding. Also conceivable is the use of this annular element for fixing in place the rings of teeth in the axial direction.

The individual bundles of laminations can also be clamped between the rows made up of tooth elements arranged in succession in the circumferential direction, which preferably consist of rings of teeth that are discontinuous on one side, and, in addition, an annular element. This also holds true for the intervening element.

Provided in the simplest case is at least one annular element, which extends in the axial direction over at least a portion of the axial extension of the stator module and preferably extends over the entire extension and on which the bundles of laminations are supported in the radial direction via so-called fasteners in the radial direction in the form of pins or similar elements that compensate for the different heights. Accomplished in this way is a force-fitting connection—for example, a press-fitting connection—which fixes in place to the greatest extent possible the position of the individual elements—the tooth element as well as the yoke unit—with respect to one another in the axial and radial directions. The axial fastening of the yoke unit and of the tooth elements is produced preferably via a corresponding means of fastening—for example, in the form of tighteners, which extend through the entire assembly in the axial direction and clamp together the individual elements, namely, the ring of teeth, the yoke unit, and the intervening element.

The inventive solution is explained below on the basis of figures. Depicted therein in detail is the following:

FIG. 1b illustrates a view according to FIG. 1a.

Figure 1A:
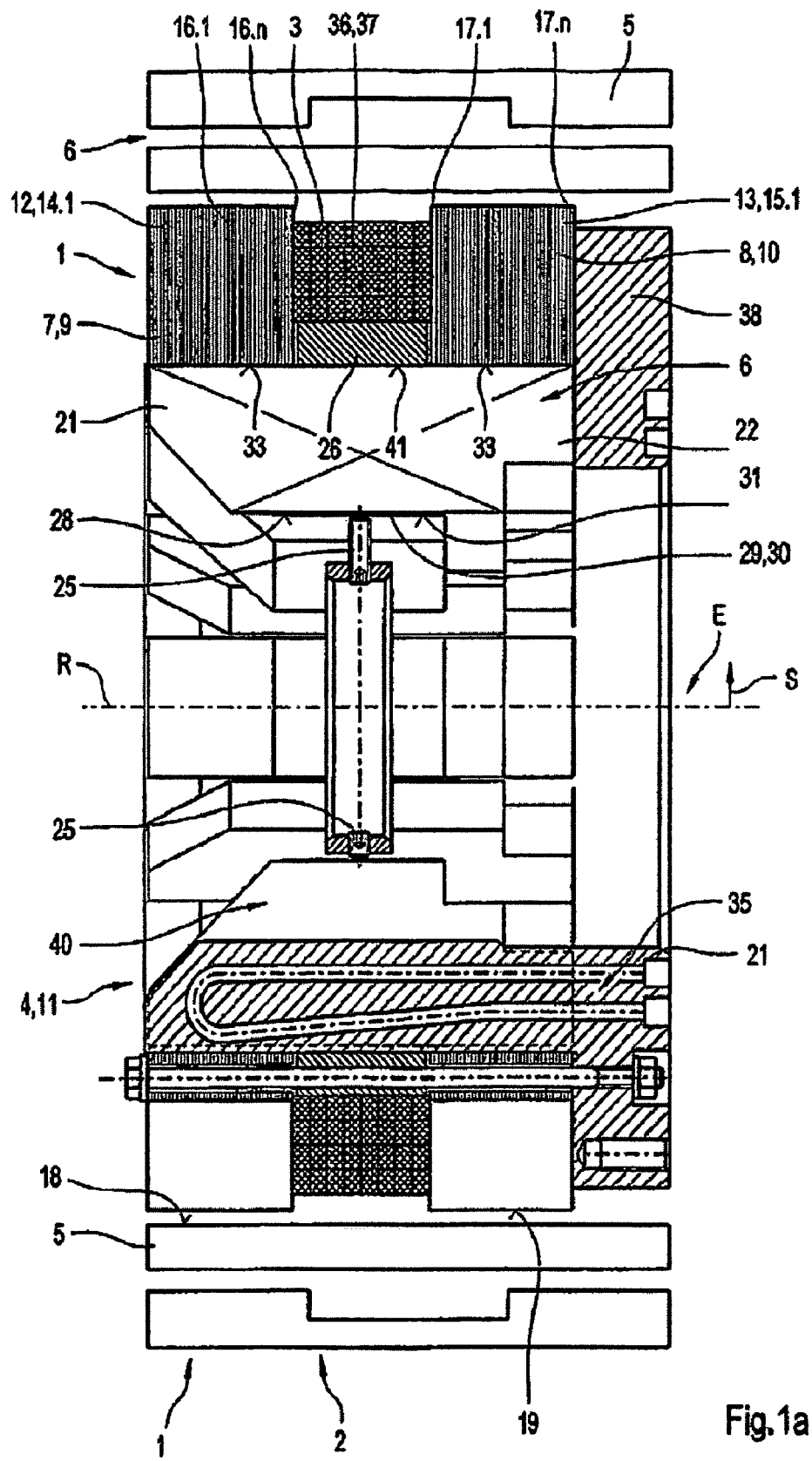
FIG. 1a illustrates, in a schematically simplified depiction based on an excerpt of an axial section of a stator unit of a synchronous machine having transversal flux machine[1], the basic construction of a stator unit provided for one phase and bearing an armature winding.

FIG. 1a illustrates, in a schematically simplified depiction, based on an excerpt of an axial section of a stator module 1 of a synchronous machine 2 with transversal flux guidance, in particular a transversal flux machine, the basic construction of a stator unit 4 designed in accordance with the invention and bearing an armature winding 3. Here, the stator unit 4 represents one element of the stator module 1. The stator unit 4 is arranged in a stator housing, which is not depicted here in detail. Mounted in this housing is a rotor of the synchronous machine 2 with transversal flux guidance. The stator unit 4 is provided for the rotor, in particular for one phase, with the formation of an air gap 6. In the case depicted, the rotor 5 is only alluded to and is designed as an outer rotor; that is, the stator module 1 comprises at least one inner stator and preferably also one outer stator. The stator unit 4 is a component part of the inner stator. In a view in the axial section of the electric machine according to FIG. 1a, for projection in a plane E, which is defined by the axis of rotation R of the rotor and a normal line S in the vertical direction to it, the stator unit 4 describes an essentially U-shaped formed cross-sectional surface. For this purpose, the stator unit 4 comprises an annular yoke unit 6, which assumes the function of a short-circuit element and which, together with two soft-iron units 9 and 10, constructed as rings of teeth 7 and 8, respectively, forms a structural unit 11. Here, the term soft-iron unit stands for elements made of soft-magnetic materials. The rings of teeth 7 and 8 are constructed in such a way that, when they are viewed in cross section, they form two arms 12 and 13 of the stator unit 4. In their functional position, they are situated opposite the permanent magnets of the rotor 5. The arms are formed from teeth 14.1 to 14.n and 15.1 to 15.n, respectively, arranged in succession in the circumferential direction. Here, the individual teeth 14.1 to 14.n and 15.1 to 15.n, respectively, can be comprehended as individual tooth elements with an annular element, forming the structural unit of the rings of teeth 7 and 8, or else as several lamination-sheet rings stacked transverse to the axial direction. Situated between the rings of teeth 7 and 8 is the armature winding 3, which is enclosed on three sides and runs in the circumferential direction. The individual teeth 14.1 to 14.n and 15.1 to 15.n, respectively, of the rings of teeth 7 and 8, respectively, are arranged at a spacing from one another in the circumferential direction with a pitch in a specific ratio to the pole pitch T on the rotor 5. In order to accomplish a simple assembly, the soft-iron units 9 and 10 are designed in the form of rings of teeth 7 and 8. Preferably, the individual rings of teeth 7 and 8 are designed as axially layered bundles of laminations. The stacking occurs here in the direction of the axis of rotation R of the rotor or transverse to the circumferential direction. To this end, each ring of teeth 7 and 8, respectively, consists of a multiplicity of annular elements arranged adjacent to one another in the axial direction in the form of lamination-sheet plates 16.1 to 16.n and 17.1 to 17.n, respectively. The spacing of the individual teeth 14.1 to 14.n and 15.1 to 15.n, respectively, on the lamination-sheet plates 16.1 to 16.n and 17.1 to 17.n, respectively, with a specific pitch T in relation to one another is accomplished through the design or construction of open-edge slots on the lamination-sheet rings. When the stator unit 4 is constructed as an element of the stator module 1 in the form of the inner stator, these lamination-sheet rings extend from the region of the outer circumference 18 and 19, respectively, of the lamination-sheet plates 16.1 to 16.n and 17.1 to 17.n, respectively, in the radial direction to the face 20 of the yoke unit 6 pointing toward the rotor 5. The openings formed by the open-edge slots are pointed toward the air gap or the rotor 5. The rings of teeth 7 and 8, respectively, are subdivided at least once in the circumferential direction. Preferably, a ring of teeth 7 and 8, respectively, of this kind consists of a multiplicity of adjacently stacked lamination-sheet-ring elements that are designed in one piece in the circumferential direction. However, it is also conceivable to form the individual ring of teeth 7 and 8, respectively, from a multiplicity of segments of rings of teeth arranged adjacently to one another in the circumferential direction.

Figure 1B:
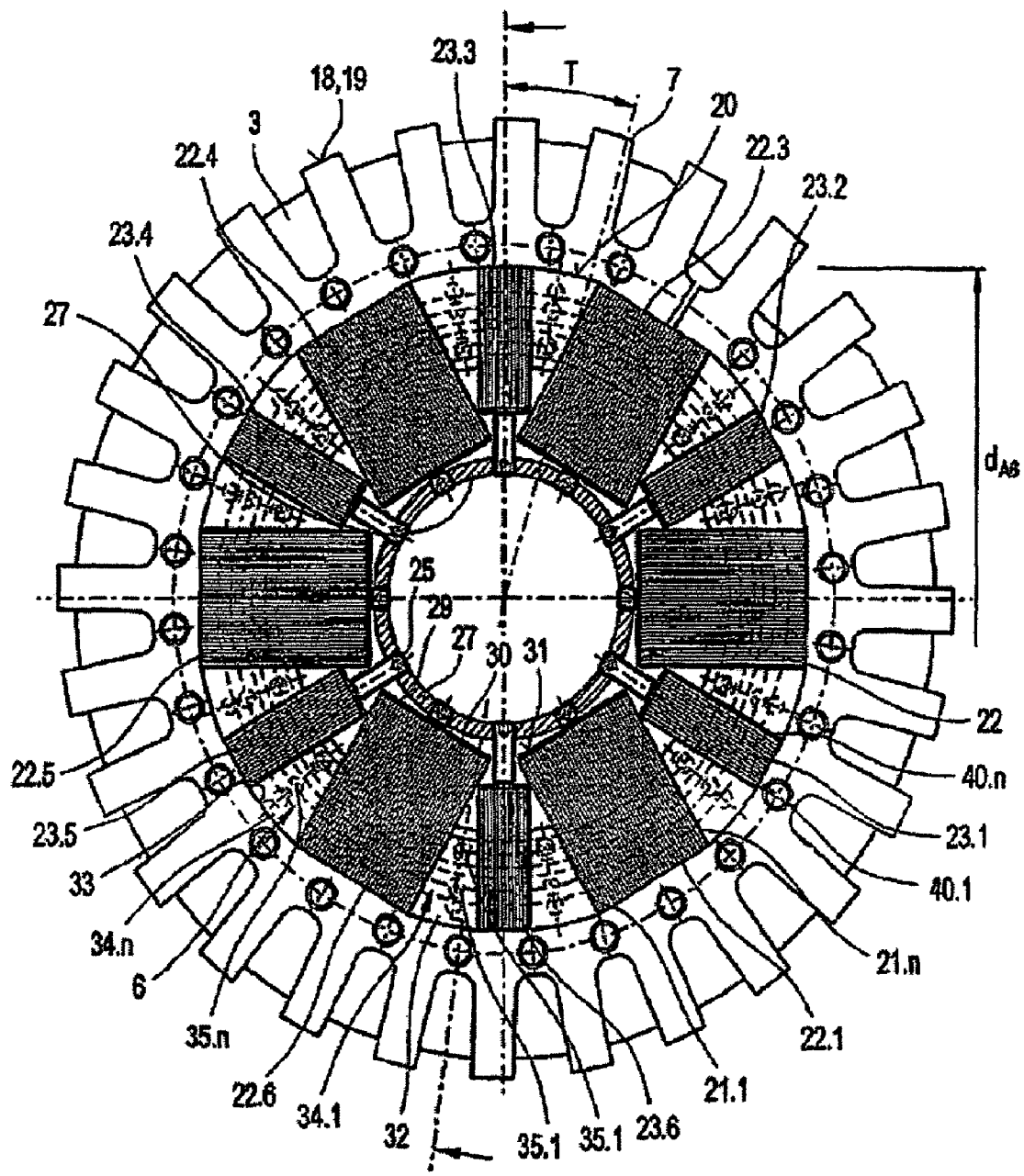

In accordance with the invention, the annular yoke unit 6 comprises magnetic lamination sheets arranged parallel to the axis of rotation R or transverse to the axial direction. The magnetic lamination sheets each extend in the axial direction and are arranged adjacent to one another or in succession in the circumferential direction. They are designated as 21 and 40 in FIG. 1a and as 21.1 to 21.n and 40.1 to 40.n in FIG. 1b. Preferably involved here are grain-oriented magnetic lamination sheets, wherein the greater part of the directional vectors characterizing the principal magnetic direction can each be described at least by a directional component aligned in the axial direction. This means that, on account of the lattice structure, an optimal magnetic conductivity in the transverse direction is afforded. Preferably, for optimal use of space, the magnetic lamination sheets are combined into bundles of laminations 22.1 to 22.n and 23.1 to 23.n, which, in their assembled position, are characterized by different heights in the radial direction. Preferably, the individual bundles of laminations 22.1 to 22.n and 23.1 to 23.n have different thicknesses, that is, thicknesses in the circumferential direction. The arrangement of the bundles of laminations of different height in alternation with one another is produced in such a way that they preferably have a common outer diameter $d_{46}$. The different heights are then compensated for via the inner circumference. Provided to this end is an annular element 27, preferably a hollow cylindrical element, on which the individual bundles of laminations 22.1 to 22.n and 23.1 to 23.n are supported via a corresponding means of support 25, the bundles of laminations being fixed in place in their radial direction via the means of support 25 and the rings of teeth 6 and 7. The annular yoke unit 6 further comprises an intervening ring 26 that is arranged between the rings of teeth 7 and 8 and is preferably made of aluminum. It is designed with slots on the inner circumference 41; that is, it has open-edge slots, which are formed transverse to the axial direction, that is, parallel to the axis of rotation of the rotor or to the axis of symmetry of the inner stator. These open-edge slots take on a guide function. The bundles of laminations are inserted into them. Each bundle of laminations 22.1, 22.$n$, 23.1, 23.$n$ is further fixed in place as a bundle in the radial direction in the region of its own inner diameter or of the front face 28 facing away from the armature winding 3, preferably via means 29 for fixing in place the individual magnetic lamination sheets. In the simplest case, these means 29 are constructed as magnetic-lamination-sheet elements 30, it being possible to design them in a slotted form as well, thereby forming a guide for the individual magnetic lamination sheets. The magnetic-lamination-sheet element 30 further serves as a supporting surface 31 for the means of support 25 in order to hold the bundles of laminations 22.1 to 22.$n$ and 23.1 to 23.$n$ in their position in the radial direction. Through alternating fastening of the high and low bundles of laminations 22.1 to 22.$n$ and 23.1 to 23.$n$ on the inner diameter 33 of the rings of teeth 7 and 8 and of the slotted aluminum ring in the form of the intervening ring 26, there are formed intervening spaces 34.1 to 34.$n$, which are shaped like pieces of cake and which are filled by spacers in the form of aluminum fingers 32. The aluminum fingers 32 preferably have cooling channels 35.1 to 35.$n$, which are cast during the forming operation or finished by subsequent processing or boring. The winding 3, the two rings of teeth 7 and 8, and the bundles of laminations 22.1 to 22.$n$ and 23.1 to 23.$n$ are cooled via these channels. In an especially advantageous design, the necessary joint gaps are filled with an impregnating resin during impregnation of the winding 3 so as to improve the cooling effect. The bundles of laminations 22.1 to 22.$n$ and 23.1 to 23.$n$ are thereby provided with the required mechanical strength in this element assembly.

There exist a large number of possibilities for the coupling between the rings of teeth 7 and 8 and the yoke unit 6, which, in the functional state, functions as a so-called short-circuit ring and mechanically fulfills the function of a supporting element. Preferably, when the rings of teeth 7 and 8 are designed as soft-iron bundles of laminations in slotted design, a form-fitting or, depending on the design, even a force-fitting coupling between the annular yoke unit 6 and the individual lamination-sheet plates of the tooth elements of the rings of teeth 7 and 8 is made. In the simplest case, this can be provided through a press-fitting connection. In this case, the individual elements of the stator unit 4, the annular yoke unit 6, and the rings of teeth 7 and 8 are to be designed in terms of their dimension in such a way that they are pressed together in a specific way. In detail, this applies at least to the faces or linear regions that are formed on the front face of the bundles of laminations 22.1 to 22.$n$ and 23.1 to 23.$n$ directed toward the rotor 5 and engage one another in mechanical linkage and to the face regions on the front face of the rings of teeth 7 and 8 that are directed toward the yoke unit 6 and are engaged with the bundles of laminations in mechanical linkage.

Other possibilities of coupling between the rings of teeth 7 and 8 and the yoke unit 6 in the radial and axial directions consist of form-fitting connections. To this end, it is conceivable, for example, to design the bundles of laminations of the rings of teeth 7 and 8 in a slotted manner, the individual sheets of the bundles of laminations 22.1 to 22.$n$ and 23.1 to 23.$n$ of the yoke unit being guided in these slots.

In detail, a plurality of possible embodiments are conceivable, but, they will not be addressed here individually.

The armature winding 3, which is arranged between the two arms 12 and 13 formed by the rings of teeth 7 and 8, is wound directly on the annular yoke element 6 or the annular element 26 surrounding it and is fixed in place in the axial direction by partial surfaces of the front faces of the rings of teeth 7 and 8 that point toward each other. The fixing in place in the radial direction results for the design of the stator module 1 as an inner stator and winding-bearing stator unit 4 from the tightness generated during winding. Here, the armature winding 3 lies directly on a partial surface 36 of the face 37 of the yoke unit 6 directed toward the rotor 5, preferably on the intervening ring 26.

The stator unit 4, which consists of the annular yoke unit 6 and the intervening ring 26 as well as the rings of teeth 7 and 8 and the armature winding 3, can be provided beforehand as a completely premounted assembly unit. Preferably, additional connecting elements for clamping the stator unit 4 in the axial direction are provided. In this case, one connecting element is depicted by way of example. Further provided for realizing the clamping of the stator unit 4 in the axial direction are end rings—here, at least one end ring 38, which forms a stop for at least one of the rings of teeth 7 and 8 in the axial direction. The connecting element thereby clamps the unit consisting of the rings of teeth 7, 8, the intervening ring 26, and the yoke unit 6 against the end ring 38 or, for designs with end rings placed at both ends, against the two end rings. In the embodiment according to FIG. 1$a$, only one end ring 38 is provided. The connecting element extends preferably through the rings of teeth 7 and 8 as well as the intervening element 26 coupled with the yoke unit. The axial clamping is provided with the pretensioning required for the torque on the inner stator or the stator unit 4.

FIG. 1$b$ illustrates, on the basis of a side view, the embodiment of an inventive yoke unit 6. It is evident from it that the rings of teeth 7 and 8 are designed in a discontinuous manner in the circumferential direction, so as to prevent ring currents. Also conceivable would be a subdivision of the rings of teeth 7,8 into several individual segments.

The inventive solution is not limited to the design according to FIGS. 1$a$ and 1$b$. Conceivable is the application of the design of the stator unit 4 in synchronous machines having transverse flux guidance with a differing number of phases. In regard to the concrete embodiment of the individual elements, in particular the yoke unit 6 and the rings of teeth 7,8, modifications of the designs described in FIGS. 1$a$ and 1$b$ are possible. The invention thereby includes designs of stator units in which the individual elements are designed to be annular.

There also exist a large number of possibilities in regard to the embodiment of the cooling channels. They can pass, as depicted in FIG. 1$a$ by way of example, through the entire spacer in the form of the aluminum finger 32, whereby they extend through the latter with forward and return passage and the connections for the inlet and outlet end on the same front face. The course of a cooling channel, which extends from one front face to the next front face, is illustrated by a dot-dash line.

LIST OF REFERENCE NUMERALS

1 stator module
2 synchronous machine with transversal flux guidance
3 armature winding
4 stator unit
5 rotor
6 annular yoke unit
7 ring of teeth
8 ring of teeth
9 soft-iron unit
10 soft-iron unit
11 structural unit
12 arm
13 arm
14.1, 14.$n$ tooth 15.1, 15.n tooth
16.1, 16.n lamination-sheet plate
17.1, 17.n lamination-sheet plate
18 outer circumference
19 outer circumference
20 face
21.1, 21.n magnetic lamination sheet
22.1, 22.n bundle of laminations
23.1, 23.n bundle of laminations
24 annular element
25 means of support
26 intervening element
27 annular element
28 front face
29 means for fixing in place the individual magnetic lamination sheets
30 lamination-sheet element
31 supporting surface
32 aluminum finger
33 inner diameter
34.1, 34.n intervening space shaped like a piece of cake
35.1, 35.n cooling channels
36 partial surface
37 face
38 end ring
40.1, 40.n magnetic lamination sheet
41 inner circumference

The invention claimed is:

1. A stator module for a transversal flux machine having at least one phase, comprising:
a rotor having an axis of rotation, said axis of rotation having an axial direction; and
a stator unit for the at least one phase, said stator unit having an armature winding and forming an air gap with said rotor, said stator unit being arranged in a radial direction in relation to the axis of rotation, said stator unit, comprising:
a first and second row of teeth being arranged in a circumferential direction, said first and second row of teeth being connected together by a yoke unit, said yoke unit having an annular design, and said yoke unit having a plurality of magnetic lamination sheets stacked in succession in said circumferential direction, wherein each one of said plurality of magnetic lamination sheets are grain-oriented magnetic lamination sheets having a principal magnetic direction; and
a majority of directional vectors describing the principal magnetic direction are aligned in said axial direction of a first row of tooth elements of said first row of teeth to a second row of tooth elements of said second row of teeth.

2. A stator module for a transversal flux machine having at least one phase, comprising:
a rotor having an axis of rotation, said axis of rotation having an axial direction; and
a stator unit for the at least one phase, said stator unit having an armature winding and forming an air gap with said rotor, said stator unit being arranged in a radial direction in relation to the axis of rotation, said stator unit, comprising:
a first and second row of teeth being arranged in a circumferential direction, said first and second row of teeth being connected together by a yoke unit, said yoke unit having an annular design, and said yoke unit having a plurality of magnetic lamination sheets stacked in succession in said circumferential direction, wherein each one of said plurality of magnetic lamination sheets are combined into a plurality of magnetic bundles of laminations, wherein each one of said plurality of magnetic bundles of laminations has at least two of said plurality of magnetic lamination sheets arranged in succession in said circumferential direction, wherein each one of said plurality of magnetic bundles of laminations are arranged in succession, in a spaced manner, and in said circumferential direction forming a plurality of intervening spaces, and wherein each one of said plurality of magnetic bundles of laminations has an inner circumferential face.

3. The stator module of claim 2, further comprising a plurality of spacer elements arranged in said plurality of intervening spaces adjacently arranged in said circumferential direction.

4. The stator module of claim 3, wherein each one of said plurality of magnetic bundles of laminations are arranged in said radial direction dependent on a height of at least one of said plurality of magnetic lamination sheets.

5. The stator module of claim 3, wherein said inner circumferential face of two of said plurality of magnetic bundles of laminations are arranged adjacent to each other in said circumferential direction and lie on different diameters.

6. The stator module of claim 5, wherein said two of said plurality of magnetic bundles of laminations have a different thickness in said circumferential direction.

7. The stator module of claim 6, wherein said two of said plurality of magnetic bundles of laminations are arranged alternately in said circumferential direction.

8. The stator module of claim 3, wherein said plurality of spacer elements comprise a device for indirect cooling of the stator module.

9. The stator module of claim 8, wherein said device for indirect cooling of the stator module has a plurality of cooling medium channels that extend through said plurality of spacer elements.

10. A stator module for a transversal flux machine having at least one phase, comprising:
a rotor having an axis of rotation, said axis of rotation having an axial direction; and
a stator unit for the at least one phase, said stator unit having an armature winding and forming an air gap with said rotor, said stator unit being arranged in a radial direction in relation to the axis of rotation, said stator unit, comprising:
a first and second row of teeth being arranged in a circumferential direction, said first and second row of teeth being connected together by a yoke unit, said yoke unit having an annular design, and said yoke unit having a plurality of magnetic lamination sheets stacked in succession in said circumferential direction, further comprising an annular intervening element that has said armature winding and surrounds said yoke unit at least partially in said circumferential direction and at least partially in said axial direction.

11. The stator module of claim 10, wherein each one of said plurality of magnetic lamination sheets or each one of said plurality of magnetic bundles of laminations are connected in a formfitting and/or force fitting coupling with said first and second rows of teeth in succession in said circumferential direction and/or with said annular intervening element.

12. The stator module of claim 11, wherein said force-fitting coupling is a press-fitting connection.

13. The stator module of claim 12, wherein said first and second rows of teeth and/or said annular intervening element have guide slots in an inner diameter region, said guide slots being aligned in said axial direction and receiving said plurality of magnetic lamination sheets and/or said plurality of magnetic bundles of laminations.

14. The stator module of claim 10, wherein each one of said plurality of magnetic lamination sheets or said plurality of magnetic bundles of laminations are connected in a material-fitting manner with said first and second rows of teeth and/or with said annular intervening element.

15. The stator module of claim 11, further comprising:
- a device for fixing in place each one of said plurality of magnetic bundles of laminations in said radial direction in an assembled position, said device comprising:
  - a first annular element extending at least over a portion of an axial extension of said plurality of magnetic bundles of laminations; and
  - a support between said first annular element and said inner circumferential faces, said support being directed toward said axis of rotation.

16. The stator module of claim 1, wherein said first and second rows of tooth elements are each formed by said first and second rows of teeth or by a plurality of segments of said first and second rows of teeth arranged adjacently to one another in said circumferential direction and are constructed identically and are staggered in succession in said circumferential direction by a pole pitch.

17. The stator module of claim 16, wherein said first and second rows of teeth or said plurality of segments of said first and second rows of teeth comprise said plurality of magnetic lamination sheets, said plurality of magnetic lamination sheets being stacked and being arranged transverse to said axis of rotation or in succession in said axial direction.

18. The stator module of claim 10, wherein said first and second rows of teeth or said plurality of segments of said first and second rows of teeth comprise said annular intervening element having a plurality of open edge recesses in a region of an outer diameter, said plurality of open-edge recesses being arranged in specific predefined spacings and forming said first and second rows of tooth elements.

19. The stator module of claim 17, wherein said first and second rows of teeth have at least one interruption in said circumferential direction.

20. The stator module of claim 3, wherein said plurality of spacer elements extend in said axial direction over a width of the stator module which extends in said radial direction on a front face of the stator module.

21. The stator module of claim 20, further comprising an end ring for each of said first and second rows of teeth, said end ring limiting movement in said axial direction.

22. The stator module of claim 21, further comprising a device for clamping said first and second rows of teeth, said yoke unit, and said end ring.

23. The stator module of claim 3, further comprising a plurality of joint gaps between each one of said plurality of spacer elements, said plurality of joint gaps being filled with impregnating resin.

* * * * *